US012199368B2

(12) United States Patent
Biehler

(10) Patent No.: US 12,199,368 B2
(45) Date of Patent: Jan. 14, 2025

(54) WIRELESS COMMUNICATION BACKPLANE

(71) Applicant: Schneider Electric Industries SAS, Rueil Malmaison (FR)

(72) Inventor: Aymeric Biehler, Saint-Laurent-du-Var (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 131 days.

(21) Appl. No.: 18/077,247

(22) Filed: Dec. 8, 2022

(65) Prior Publication Data

US 2023/0187834 A1 Jun. 15, 2023

(30) Foreign Application Priority Data

Dec. 15, 2021 (EP) .................................... 21306782

(51) Int. Cl.
*H01Q 9/04* (2006.01)

(52) U.S. Cl.
CPC ......... *H01Q 9/0457* (2013.01); *H01Q 9/0421* (2013.01)

(58) Field of Classification Search
CPC ........ H01Q 1/38; H01Q 1/22-24; H01Q 9/04; H01Q 21/0025; H01Q 21/06
See application file for complete search history.

(56) References Cited

U.S. PATENT DOCUMENTS

| | | | | |
|---|---|---|---|---|
| 5,404,145 | A | 4/1995 | Sa et al. | |
| 6,061,035 | A | 5/2000 | Kinasewitz et al. | |
| 11,437,724 | B2 * | 9/2022 | Min | H01Q 9/0407 |
| 11,652,301 | B2 * | 5/2023 | Yang | H01Q 25/00 343/700 MS |
| 2021/0314027 | A1 | 10/2021 | Dessales et al. | |

OTHER PUBLICATIONS

European Search Report and Search Opinion dated Jun. 14, 2022 for corresponding European Patent Application No. 21306782.0, 12 pages.

* cited by examiner

*Primary Examiner* — Hasan Islam
(74) *Attorney, Agent, or Firm* — Locke Lord LLP

(57) ABSTRACT

An apparatus for wireless communications between communication modules, the apparatus including a main transmission line which has a plurality of coupling points, wherein the apparatus comprises a plurality of main antennas, and wherein each main antenna is linked to a coupling area for a directional coupling between the main antenna and the main transmission line at a coupling point and each main antenna is adapted to communicate with an auxiliary antenna linked to a communication module.

13 Claims, 3 Drawing Sheets

WIRELESS COMMUNICATION BACKPLANE

FIELD OF INVENTION

The present invention relates to a short-distance radio-frequency communications system allowing equipment to communicate with a plurality of detachable modules with the aid of a wireless link.

BACKGROUND

Industrial automation/control systems are employed for controlling operation of a wide variety of systems, including processes, machines, etc., and are typically adaptable to different control applications through configuration and interconnection of multiple control system components or devices, such as control modules, Input/Output (I/O) modules, I/O devices, etc. Existing industrial control systems typically include a processor running or executing a control program to interact with an I/O system (e.g., typically one or more I/O modules or devices) to receive system information in the form of analog and/or digital inputs from field sensors and to provide outputs (analog and/or digital) to one or more actuators. Industrial control systems are increasingly being interconnected with management information and other systems in a manufacturing facility, and may be operatively connected to any number of communications networks to facilitate various business management functions such as inventory control, accounting, manufacturing control, etc., in addition to the process/machine control functionality.

There is therefore a need to find a simple, space-saving and economical solution for making a plurality of communication modules communicate directly between them by virtue of a wireless link (i.e. without electrical contact). The number of communication modules should be advantageously variable, making possible to very easily remove, replace or add one or more communication modules.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided an apparatus for wireless communications between communication modules, the apparatus including a main transmission line which has a plurality of coupling points, characterized in that the apparatus comprises a plurality of main antennas, wherein each main antenna is linked to a coupling area for a directional coupling between said main antenna and the main transmission line at a coupling point and each main antenna is adapted to communicate with an auxiliary antenna linked to a communication module.

Advantageously, the apparatus can handle any number and combination of communication modules, as communication modules no longer affect the impedance adaptation of the main transmission line. The main transmission line can thus be designed according to deterministic parameters for the line impedance like thickness, width or type of substrate, these deterministic parameters being adapted to the frequencies desired for the main antennas and auxiliary antennas.

Advantageously, the apparatus is able to greatly limit the range of the wireless communications in order to avoid such a communications system interfering with the environment, in particular by the transmission of radio waves, to avoid it being interfered with by the environment, such as by transmitters that may be situated nearby (for example Wi-Fi transmitters), and also to avoid two systems side by side being able to interfere with each other.

In an embodiment, a main antenna is in communication with an auxiliary antenna of a communication module when said communication module is placed above the main antenna.

In an embodiment, the communication modules are detachable modules.

In an embodiment, the main transmission line and the main antennas are conductive tracks integrated in one and the same printed circuit board.

In an embodiment, the coupling points and the coupling areas are rectilinear in shape.

In an embodiment, each main antenna is linked to a coupling area via a secondary transmission line, the main antenna and the secondary transmission line having each a terminators having line-end impedance equal to the characteristic impedance of said secondary transmission line.

In an embodiment, the main transmission line has two terminators having line-end impedances equal to the characteristic impedance of the main transmission line.

In an embodiment, the length of the coupling areas depends on the working frequency of the main antennas.

In an embodiment, the coupling areas present directional couplings that are capacitive and inductive couplings.

In an embodiment, the main antennas are planar inverted-F antenna.

In an embodiment, the main antennas are the same type as the auxiliary antenna.

In an embodiment, the printed circuit board is mounted in a metal housing that surrounds a substrate of the printed circuit board and that includes a panel which sits on top of the main transmission line and presents holes above the main antennas allowing to place a communication module on the housing, such that the auxiliary antenna of said communication module is situated just above a main antenna.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
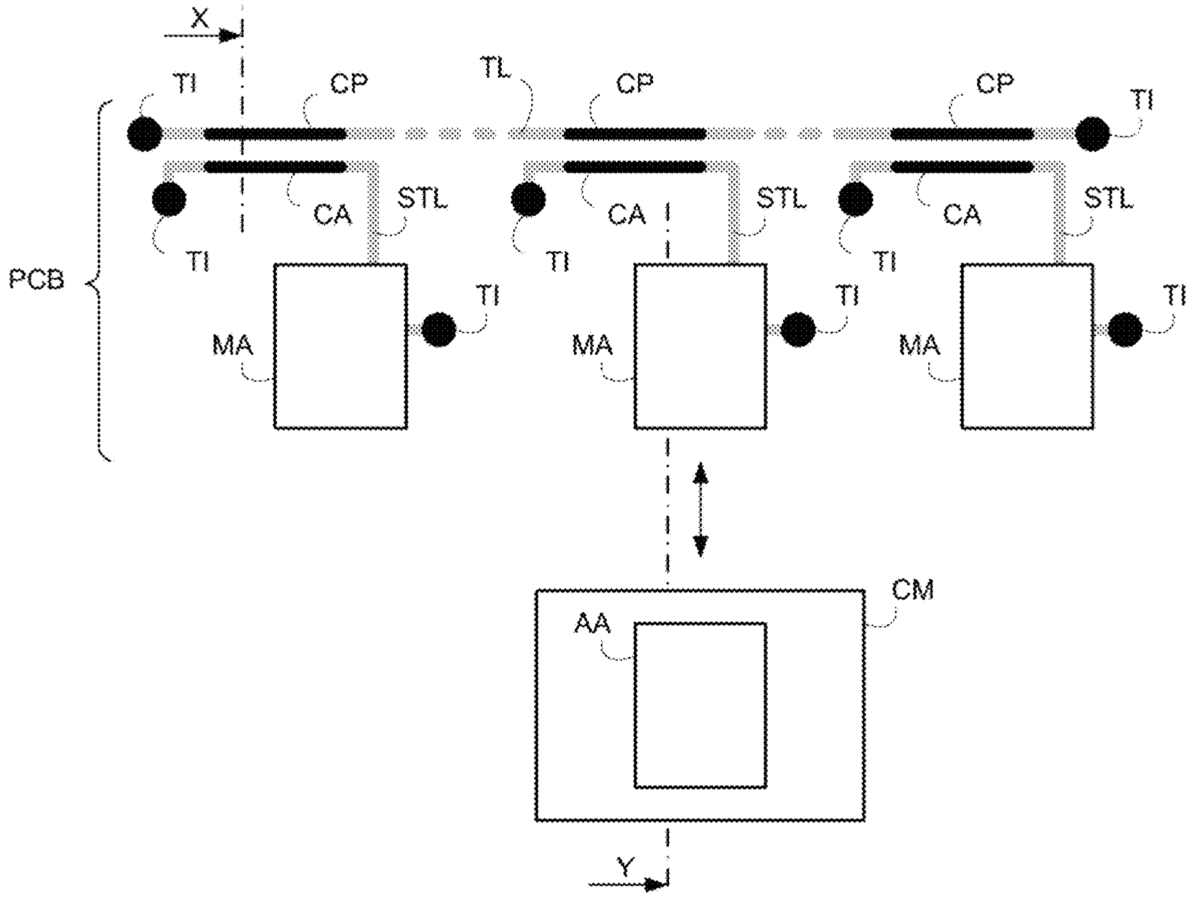
FIG. 1 shows a simplified diagram of a communications system according to one embodiment.

With reference to FIG. 1, a communication system comprises a set of communication modules CM and a printed circuit board PCB.

The aim of a short-distance wireless radio-frequency communications system is to make the communication modules CM communicate between them in the context of an automation application. A communication module CM may for example be an automation device of programmable logic controller or microcontroller type having an electronic component (or chip) for radio transmission/reception. The communications between communication modules CM may be performed according to various communications protocols, as long as these protocols have an adequate data rate for the desired application and a transmission frequency which does not require lengths of electric lines which are too great. For example, a protocol such as Bluetooth or Zigbee may be used the components of which are inexpensive, such as a BLE (Bluetooth Low Energy) component. The communication modules CM are for example man-machine dialogue units, of push-button or switch type, a visual or acoustic signaling unit (a lamp, a buzzer, etc.) and/or sensors or detectors, which also have a component for radio transmission/reception.

It is frequently desirable to upgrade an automation application by changing or adding man-machine dialogue units, depending for example on the needs of the user client. Moreover, it is advantageous to be able to replace one unit with another for various reasons, notably for maintenance.

To obtain such a modular, upgradeable and easily modifiable system, the communication modules CM are mounted and connected detachably, that is to say that a communication module CM may be easily removed, replaced or added without interfering with any wireless communications from the communication system. Likewise, the presence or the absence of a communication module CM on a location has no influence on the communications of the other communication modules CM.

The printed circuit board PCB includes a main electrical transmission line TL which is connected on both sides to a terminator impedance TI notably for avoiding the reflected waves. This main transmission line TL has a plurality of coupling points CP which are positioned in various places along the main line. In FIG. 1, only three coupling points CP are shown for the sake of simplifying the diagram. The main line TL is preferably produced by a conductive track which is placed upside the printed circuit board PCB as detailed below. The terminator impedance TI is for example 50 ohms and the main line must also have a precise characteristic impedance, typically of 50 ohms. This characteristic impedance is essentially determined by the width and the thickness of copper of the track as well as the width of the dielectric of the printed circuit board PCB and its electrical permittivity.

The printed circuit board PCB also comprises a plurality of secondary electrical transmission lines. FIG. 1 shows secondary transmission lines STL, each having a coupling area CA allowing a directional coupling to be produced with the main transmission line TL at a coupling point CP.

Advantageously, the presence of secondary transmission lines (allowing the transmission of the radio communications between the communication modules CM), not electrically connected to the main transmission line, provides a simple solution which allows mismatching of the main transmission line (and therefore potentially unstable or variable performance) depending on the number and the presence or absence of communication modules CM connected to the communications system to be avoided.

Generally speaking, a directional coupling diverts a portion of a signal travelling through a primary transmission line to a secondary transmission line. In the present document, the expression "directional coupling" is used to mean that the coupling between two electrical lines close to one another in order to carry out the communications is performed capacitively and also inductively. These directional couplings are produced with electrical lines which are for example of "microstrip" or preferably "stripline" type In the embodiment shown, the main transmission line and the secondary transmission line are preferably rectilinear, substantially parallel to each other and at a small distance from one another at the coupling points CP and at the coupling areas CA, so as to obtain a good coupling. However, instead of a rectilinear shape, other shapes are also possible, such as zig-zag or sawtooth shapes, which would allow the geometric length of these areas to be limited while preserving an electrical length which is satisfactory and compatible with the wavelength used.

Each secondary transmission line STL is connected on one side to a terminator impedance TI and on the other side to a main antenna MA through an impedance adapter. The main antenna is also connected to a terminator impedance TI. It is assumed that all terminator impedances TI are similar, for example 50 ohms.

The main antenna MA could be any kind of shorted antenna, that can be printed on printed circuit board PCB and used for wireless circuitry implemented in microstrip. For example, the main antenna MA can be a monopole antenna running parallel to a ground plane and grounded at one end.

In one embodiment, the main antenna is a planar inverted-F antenna (PIFA), being a short and compact antenna that can be impedance matched to the feed circuit by a designer, allowing it to radiate power efficiently, without the need for extraneous matching components. In this case, the total height of the main antenna can be about 8 mm and the total width of the main antenna can be about 10 mm.

Each communication module CM includes an auxiliary antenna AA linked to a communication adapter configured to transmit a signal to the auxiliary antenna, for example based on modulation and multiplexing methods. In one example, the communication module uses a quadrature amplitude modulation to transmit a signal to the auxiliary antenna. The auxiliary antenna AA may be any kind of antenna able to communicate with a main antenna. In one embodiment, the auxiliary antenna AA is the same type as the main antenna MA.

Each communication module CM may be supplied with electric power by various means which are not detailed in the present document, such as a cell/battery or a magnetic induction power supply. A magnetic induction power supply may implemented at a low frequency which is therefore far from the bands covered by the radio modules (e.g.: 2.4 GHZ) and will therefore not generate interference with the communication system.

Figure 2:
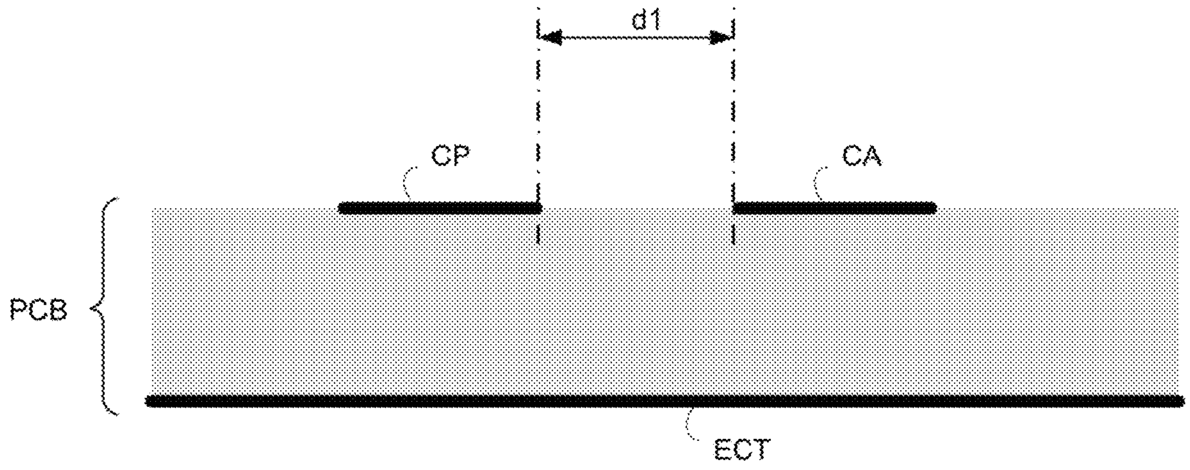
FIG. 2 details a sectional view along an axis X of the coupling between a main transmission line and a secondary transmission line.

FIG. 2 shows a cross-sectional view of the printed circuit board PCB, referred to as the main printed circuit board, produced at the coupling point CP, along an axis X of FIG. 1. It can be seen that the coupling point CP of the main transmission line TL is situated in the same horizontal plane of the printed circuit board PCB as the coupling area CA of the secondary transmission line STL. Advantageously, the main transmission line TL (not represented) and the secondary transmission lines STL (not represented) are conductive tracks integrated in the same printed circuit board PCB, which simplifies the production of the communications system.

The main printed circuit board PCB is a multilayer printed circuit board and is composed of an external conductive track ECT made of copper which is electrically connected to a zero potential (0 V) of the printed circuit board in order to form a screen and thus limit the propagation of the radio waves. The printed circuit board PCB also includes external conductive tracks made of copper forming the main transmission line TL and the secondary transmission lines STL. The printed circuit board PCB may for example be manufactured with conductive layers, from which one of the copper layers are removed by trimming. By way of example, the thickness of the external conductive tracks may be 35 μm, with a complete thickness of the printed circuit board of approximately 0.8 mm. Typically, at the coupling point CP, the coupling area CA has for example a length of 5.9 mm and the distance d1 between the coupling point CP of the main transmission line TL and the coupling area CA of the secondary transmission line STL is for example 0.7 mm.

Moreover, the conductive track of the secondary transmission STL is preferably wider at the coupling area CA. Generally speaking, it is clear that, the smaller the distance d1 and the greater the length and the width of the coupling area CA, the better the coupling will be. These various parameters may therefore be exploited to optimize the coupling with respect to existing dimensions and constraints.

Figure 3:
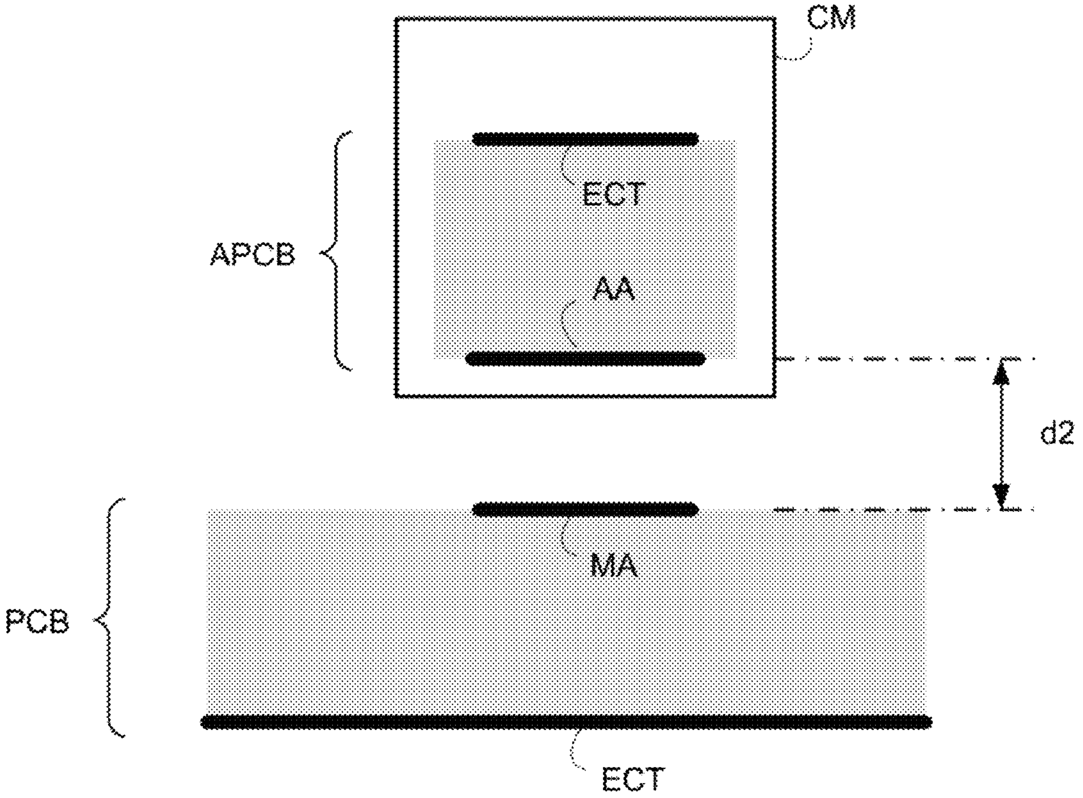
FIG. 3 details a sectional view along an axis Y of the coupling between a main antenna linked to a secondary transmission line and an auxiliary antenna of a communication module.

FIG. 3 shows a cross-sectional view of the main printed circuit board PCB produced at a main antenna MA, along an axis Y of FIG. 1. In this example, the communication module CM includes an auxiliary printed circuit board APCB, which has an auxiliary antenna AA similar to the main antenna MA, comprising a conductive layer made of copper that is placed on the upper portion of the auxiliary printed circuit board.

Typically, the distance d2 between the main antenna MA and the auxiliary antenna is for example in the order of 1 cm.

When it is desirable to connect a communication module CM to the communication system, it therefore suffices simply to place the communication module CM on the main printed circuit board PCB, such that the auxiliary antenna AA of the communication module CM is situated just above a main antenna MA, which allows the auxiliary antenna AA to be positioned near the main antenna MA and to transmit a wireless signal to the main antenna in short distance. Thus, the radio communications between at least two communication modules CM will be made on one hand through the auxiliary antennas AA and respective main antennas MA and on the other hand through the directional coupling between the coupling areas AA (associated with said main antennas) and the main transmission line TL.

In one embodiment, when the communication module CM is placed on the main printed circuit board PCB and when both the auxiliary antenna AA and the main antenna MA are of the same type, as planar inverted-F antenna, the auxiliary antenna AA extends approximately perpendicular to the main antenna MA.

Contrary to what might be suggested by FIG. 1, which shows a simplified diagram showing an overview of the communication system, the auxiliary antenna MA (here included in the auxiliary printed circuit board APCB) and the main antenna MA of the printed circuit board PCB are therefore in two distinct planes, while the main transmission line TL and the coupling area CA of the secondary transmission line STL are in one and the same plane, as detailed clearly in FIG. 2 and FIG. 3.

In one embodiment, the printed circuit board PCB can be mounted in a metal housing that surrounds the substrate and that includes a panel which sits on top of the main transmission line and presents holes above the main antennas allowing to place a communication module on the housing, such that the auxiliary antenna of the communication module is situated just above a main antenna. Some parts of the housing form a screen for the printed circuit board PCB to produce a close field for the main transmission line, acting like a faraday cage around the main transmission line.

In one embodiment, the printed circuit board PCB of the communication system can be incorporated in a backplane, for a very strong isolation of a modular industrial PLC, for example used as a bus for Input/Output modules or a redundant bus. In other embodiments, the printed circuit board PCB of the communication system may be incorporated in routers of small size for homes with optical arrival and very high performance, or as a bus for information exchange inside an electrical panel (by lowering the frequency used by the antennas, the energy needed for communication can be drastically reduced).

The printed circuit board PCB can be designed depending on the device it is incorporated in. The printed circuit board PCB should present an overall consistency between the length of the conductive tracks, the power of the transmitters and the number of main antennas for the main transmission line. The main transmission line is a passive electronic assembly with a defined shape which allows the waves to be distributed uniformly on all the main antennas. The shape and dimensions of the main transmission line and the main antennas can thus be defined for a desired spectrum of waves to be transmitted.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. An apparatus for wireless communications between communication modules, the apparatus comprising: a main transmission line which has a plurality of coupling points, wherein the apparatus further comprises a plurality of main antennas, wherein each main antenna is linked to a respective coupling area for a directional coupling between said each main antenna and the main transmission line at a respective coupling point of the plurality of coupling points and said each main antenna is configured to communicate with an auxiliary antenna linked to one of the communication modules, and wherein the main transmission line has two terminator impedances having line-end impedances equal to a characteristic impedance of the main transmission line.

2. The apparatus according to claim 1, wherein a main antenna of the plurality of main antennas is configured to be in communication with the auxiliary antenna of the communication module when the communication module is placed above said main antenna.

3. The apparatus according to claim 1, wherein the communication modules are detachable modules.

4. The apparatus according to claim 1, wherein the main transmission line and the plurality of main antennas are conductive tracks integrated in a same printed circuit board.

5. The apparatus according to claim 1, wherein the plurality of coupling points and the respective coupling areas are rectilinear in shape.

6. The apparatus according to claim 1, wherein each main antenna is linked to a respective coupling area via a respective secondary transmission line, and wherein each main antenna and each respective secondary transmission line has a terminator impedance having a line-end impedance equal to a characteristic impedance of said each respective secondary transmission line.

7. The apparatus according to claim 1, wherein a length of the respective coupling areas depends on a working frequency of the main antennas.

8. The apparatus according to claim 1, wherein the respective coupling areas present directional couplings that are capacitive and inductive couplings.

9. The apparatus according to claim 1, wherein the plurality of main antennas are planar inverted-F antennas.

10. The apparatus according to claim 1, wherein the plurality of main antennas are a same type as the auxiliary antenna.

11. The apparatus according to claim 4, wherein the printed circuit board is mounted in a metal housing that surrounds a substrate of the printed circuit board and that includes a panel which sits on top of the main transmission line and presents holes above the plurality of main antennas allowing to place the communication module on the housing, such that the auxiliary antenna of said communication module is situated just above a main antenna of the plurality of main antennas.

12. An apparatus for wireless communications between communication modules, the apparatus comprising: a main transmission line which has a plurality of coupling points, wherein the apparatus further comprises a plurality of main antennas, wherein each main antenna is linked to a respective coupling area for a directional coupling between said each main antenna and the main transmission line at a respective coupling point of the plurality of coupling points and said each main antenna is configured to communicate with an auxiliary antenna linked to one of the communication modules, and wherein the plurality of main antennas are planar inverted-F antennas.

13. An apparatus for wireless communications between communication modules, the apparatus comprising: a main transmission line which has a plurality of coupling points, wherein the apparatus further comprises a plurality of main antennas, wherein each main antenna is linked to a respective coupling area for a directional coupling between said each main antenna and the main transmission line at a respective coupling point of the plurality of coupling points and said each main antenna is configured to communicate with an auxiliary antenna linked to one of the communication modules, wherein the main transmission line and the plurality of main antennas are conductive tracks integrated in a same printed circuit board, and wherein the printed circuit board is mounted in a metal housing that surrounds a substrate of the printed circuit board and that includes a panel which sits on top of the main transmission line and presents holes above the plurality of main antennas allowing to place the communication module on the housing, such that the auxiliary antenna of said communication module is situated just above a main antenna of the plurality of main antennas.

* * * * *